R. W. GREEN.
CYCLE LOCK.
APPLICATION FILED JULY 2, 1913.
1,099,246.
Patented June 9, 1914.
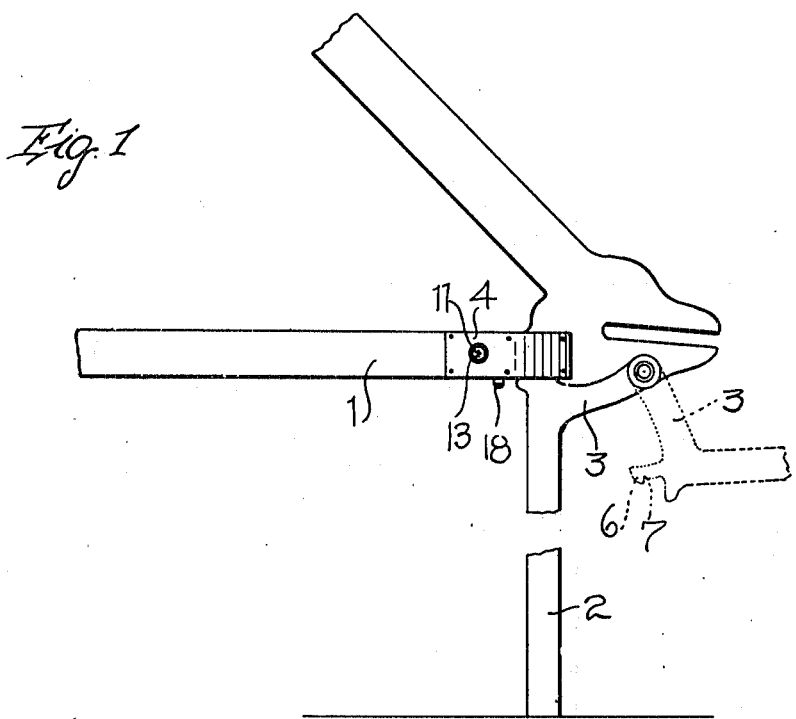
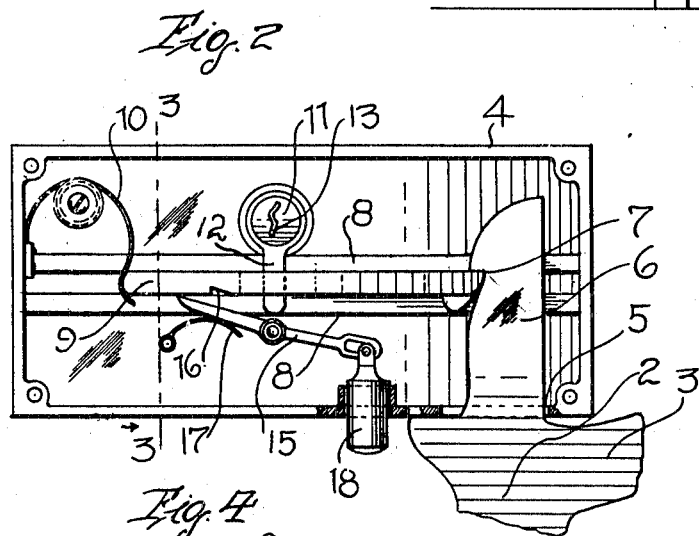
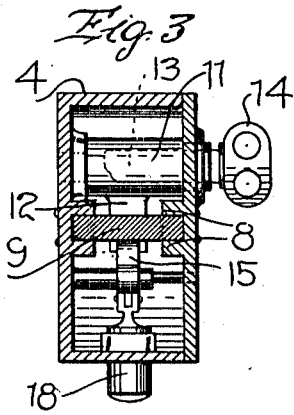
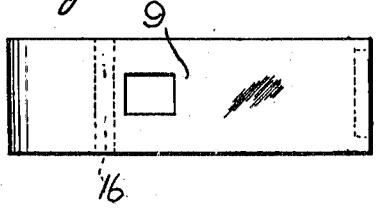
Inventor
RALPH W. GREEN
Witnesses
Robert M. Sutphen.
A. S. Hinf.
By Watson E. Coleman
Attorney

UNITED STATES PATENT OFFICE.

RALPH W. GREEN, OF MODESTO, ILLINOIS.

CYCLE-LOCK.

1,099,246.

Specification of Letters Patent.

Patented June 9, 1914.

Application filed July 2, 1913. Serial No. 777,132.

*To all whom it may concern:*

Be it known that I, RALPH W. GREEN, a citizen of the United States, residing at Modesto, in the county of Macoupin and State of Illinois, have invented certain new and useful Improvements in Cycle-Locks, of which the following is a specification, reference being had to the accompanying drawings.

This invention relates to new and useful improvements in cycle locks and more particularly to a lock for application to use in connection with a motorcycle and the primary object of the invention resides in providing a lock of this character which will securely lock the stand of a motorcycle in place and, at the same time, prevent the theft of the cycle while the stand is disposed in its effective position.

Still another object of the invention resides in providing a lock which is mounted in the frame of a vehicle to be readily engaged with a portion of the stand when the latter is disposed to its effective position and a still further object resides in providing a lock which will admit of the stand being disposed to its effective position without being engaged by the lock proper.

Still another object of the invention resides in providing a device which is simple and durable in construction, inexpensive to manufacture and one which will be very efficient and useful in operation.

With these and other objects in view, the invention consists in the novel features of construction, combination and arrangement of parts as will be hereinafter referred to and more particularly pointed out in the specification and claims.

In the accompanying drawings forming a part of this application, Figure 1 is a fragmentary side elevation of a frame of a cycle showing my improved lock applied to use thereon, and indicating in dotted lines the position of the stand therefor, when raised. Fig. 2 is an enlarged vertical section through the lock proper. Fig. 3 is a transverse section therethrough as seen on line 3—3, Fig. 2; and Fig. 4 is a plan view of the locking bar of the lock.

In describing my invention, I shall refer to the drawings in which similar reference characters designate corresponding parts throughout the several views and in which 1 indicates a frame of a motorcycle of the usual or any preferred type, to which is hingedly secured at the rear end thereof, in the usual manner, the stand 2, said stand being of the usual or any preferred type and which, when set to its effective position, has the shoulder portions 3 thereof resting in contact with the rear ends of the lower longitudinal bars of the frame 1. My improved device contemplates the provision of a lock to retain said stand in position against casual displacement and, at the same time, prevent the theft of the cycle when so disposed and when the owner is not nearby. To this end, a casing 4 is provided which is mounted within the rear end of one of the lower longitudinal bars of said frame 1. The lower edge of the casing 4, adjacent its rear end is provided with an opening 5 which is adapted to receive therein a projection 6 formed on one arm of the stand 3. This projection is designed to form a latch member or catch, the same being offset and provided with a cavity or the like 7 along one side edge thereof.

Formed on the side walls of the casing 4, in spaced parallel relation to one another are a pair of horizontal guides 8 between which is slidably disposed the locking bar 9. A spring member 10 mounted in the one end of the casing 4 has a portion thereof engaged with the one end of the locking bar to normally force the latter toward the opposite end of the casing and when so disposed under tension of the spring, said locking bar is adapted to engage the latch or catch member 6 when the same is disposed in the opening 5 of the casing or lock.

Mounted to oscillate between the front and rear walls of the lock casing 4, is a spindle or shaft 11 which has a depending arm 12 formed thereon, said depending arm having a loose connection with the sliding locking bar 9. A key-hole opening 13 is provided in the front wall of the casing which is adapted to coöperate with a key-hole slot in the one end of the spindle 11 and when a key 14 is properly introduced in the key-hole slot and engaged with the spindle, said locking bar 9 may, obviously, be retracted when the key is turned in one direction. I have provided a means for the retention of the locking bar 9 in its retracted position and to this end, a pawl 15 is provided, the same being fulcrumed intermediate of its ends between the front and rear walls of the casing. The toothed end thereof is adapted to engage a notch 16 in the lower edge of the locking bar adjacent one end thereof and a leaf spring 17 mounted in the casing has engagement with said pawl to normally force the same upwardly into engagement with the locking bar. When the locking bar 9 has been retracted to a predetermined position, the locking pawl 15 will automatically engage the notch 16 to secure said sliding bar in its retracted position. A push button 18 is slidably disposed through an opening in the lower edge of the casing 4, at a point adjacent the opening 3 therein, the inner end of said push button having a loose pivotal connection with a slot 15' in one end of the fulcrumed pawl 15. When this push button is forced inwardly, the effective end of the pawl is released of its engagement with the sliding locking bar 9 and the latter may then be disposed to its effective position.

In operation, assuming that the stand is in its raised position on the vehicle, should it be desired to lower the same and lock the device, said stand is disposed to its lowered position in the usual manner and in so doing, it is obvious that the projection 6 forming a catch member will be disposed in the opening 3 of the lock. As this is done, the locking bar 9 will be automatically engaged therewith in view of the convexed end of said member 6, so that when said stand is disposed to its lowered position, the same will be automatically locked. The rear end of the vehicle is, thereby raised above the surface of the ground and the stand locked in its lowered position. When so disposed, it will be seen that said stand cannot be raised without having first disposed the locking bar 9 to its ineffective position and thus this locking device will prevent the theft of the vehicle. When the owner of the cycle desires to raise the stand and release it of its locked engagement, the key 14 is inserted in the key-hole slot of the casing to properly engage with the spindle 11. The key is then turned in a clockwise direction, which operation will retract the locking bar 9. When said locking bar has been retracted to a certain position, the pawl 15 will be automatically engaged therewith to retain the same in said retracted position. The stand 2 may then be readily disposed to its raised position on the vehicle. After the stand has been disposed to its raised position, the vehicle is ready for use and when the operator desires to stop the machine and leave the same standing in an upright position, it is necessary, after stopping, to lower the stand, so that the projection 6 thereof will enter the lock casing. At this time, the locking bar 9 being in its retracted position, will not contact with the projection 6 as the latter enters the lock casing and will not, therefore, have any effect thereon. The stand will, therefore, be effective with regard to holding the machine in an upright position but will not be locked in such position. If, however, the operator desires to lock the stand in this position, the push button 18 is pressed inwardly, which operation will, obviously disengage the pawl 15 from the locking bar 9 and thereby permit the latter to be engaged with the projection 6 to lock the same in the casing. This operation, whereby the stand may be disposed to its lowered position, without being effectively locked, is preferable, but it will be understood that, if desired, the locking bar may be normally disposed to its locked or extended position, so that when the stand is lowered, the latter will be automatically lowered in position.

From the foregoing it will be seen that I have provided a simple, inexpensive and efficient means for carrying out the objects of the invention and while I have particularly described the elements best adapted to perform the functions set forth, it is obvious that various changes in form, proportion and in the minor details of construction may be resorted to without departing from the spirit or sacrificing any of the principles of the invention.

Having thus described this invention, what is claimed is:—

1. A lock of the class described comprising a casing having an opening in the bottom wall thereof, pairs of spaced guide rails on the inner faces of the side walls of said casing and extending the full length thereof, a bolt slidably mounted between said guide rails and having a slot therein, spring means in connection with said locking bolt and one end of the casing to normally dispose the former to its effective position over the opening in the bottom of said casing, a spindle mounted to oscillate between the side walls of said casing above the guide rails thereon, a shank formed on said spindle disposed in the slot of said bolt to retract the latter upon the turning of the spindle in one direction, means operating automatically for temporarily retaining said locking bolt in its retracted position at a predetermined point in the path of the retractive movement thereof, and means for manually releasing the bolt to its effective position after the same has been temporarily retained in its retractive movement.

2. A lock of the class described comprising a casing, said locking bolt being provided with a notch in the lower edge adjacent one end of the same, spring means in connection with one end of the locking bolt and the end wall of the casing to dispose the former to its effective operating position over the opening in the casing, means for retracting said locking bolt, a locking pawl fulcrumed intermediate of its ends between the side walls of the casing below said locking bolt, spring means in connection with a portion of the pawl on one side of its fulcrum point to normally dispose the same in contact with the lower edge of said bolt, whereby to permit the same to be engaged with the notch in said bolt when the latter is retracted to a predetermined point, the opposite portion of said pawl being provided with a slot adjacent its free end, and a push pin slidably mounted in the lower wall of said casing and having a loose pivotal connection with the slotted end of said pawl whereby to dispose the latter to its ineffective position and release the locking bolt when the pawl is engaged with the notch therein.

In testimony whereof I hereunto affix my signature in the presence of two witnesses.

RALPH W. GREEN.

Witnesses:
L. G. BROWN,
INA B. GRACEY.